US012716518B2

(12) United States Patent
Manga et al.

(10) Patent No.: US 12,716,518 B2
(45) Date of Patent: Aug. 25, 2026

(54) LEVER HANDLE FOR A FAUCET

(71) Applicant: Brasstech, Inc., Santa Ana, CA (US)

(72) Inventors: Joseph Manga, Irvine, CA (US); Thomas P. Beh, Laguna Beach, CA (US)

(73) Assignee: Delta Faucet Company, Indianapolis, IN (US)

( * ) Notice: Subject to any disclaimer, the term of this patent is extended or adjusted under 35 U.S.C. 154(b) by 128 days.

(21) Appl. No.: 18/931,911

(22) Filed: Oct. 30, 2024

(65) Prior Publication Data

US 2026/0117887 A1 Apr. 30, 2026

(51) Int. Cl.
*F16K 31/60* (2006.01)

(52) U.S. Cl.
CPC .................................. *F16K 31/605* (2013.01)

(58) Field of Classification Search
CPC ............................ E03C 1/0412; F16K 31/605
See application file for complete search history.

(56) References Cited

U.S. PATENT DOCUMENTS

| | | | |
|---|---|---|---|
| 4,653,535 | A | 3/1987 | Bergmann |
| 4,961,443 | A | 10/1990 | Buccicone et al. |
| 6,179,130 | B1 | 1/2001 | Nguyen et al. |
| 6,868,994 | B2 | 3/2005 | Kawolics |
| 6,981,693 | B1 | 1/2006 | Chang |
| 7,032,619 | B2 | 4/2006 | Gaenzle |
| 7,198,064 | B1 | 4/2007 | Hsiao |
| 7,231,935 | B2 | 6/2007 | Huang |
| 7,331,358 | B2 | 2/2008 | Gallina et al. |
| D581,020 | S | 11/2008 | Dolan |
| 7,490,619 | B2 | 2/2009 | Farag et al. |
| 7,886,763 | B2 | 2/2011 | Smith et al. |
| 8,156,963 | B2 | 4/2012 | Lopp et al. |
| 8,567,284 | B2 | 10/2013 | Huang |
| 9,481,985 | B1 | 11/2016 | Chen et al. |
| 9,677,254 | B2 | 6/2017 | Prabhakar et al. |
| 10,036,147 | B1 * | 7/2018 | Dharamshi ......... F16K 11/0787 |
| 10,053,842 | B2 | 8/2018 | Lange |
| 10,167,964 | B1 | 1/2019 | Chang |
| D868,945 | S * | 12/2019 | Garland ....................... D23/252 |

(Continued)

FOREIGN PATENT DOCUMENTS

| | | | |
|---|---|---|---|
| DE | 102004015480 A1 * | 10/2004 | ........... F16K 31/605 |
| KR | 20210001909 U | 8/2021 | |
| WO | WO 2013/093522 | 6/2013 | |

OTHER PUBLICATIONS

Newport Brass, Replacement parts, Prep/Bar Pulldown Drawing, retrieved from https://www.newportbrass.com/documents/dynamicdocuments/3200-5223.pdf on Nov. 27, 2023, 1 page.

(Continued)

*Primary Examiner* — Christine J Skubinna
(74) *Attorney, Agent, or Firm* — Bose McKinney & Evans LLP

(57) ABSTRACT

A faucet handle assembly for use with a valve assembly of a faucet. The faucet handle assembly includes a handle hub having an end wall with a slot, and a lever handle operably coupled to the handle hub. The lever handle includes an arm and a coupler. The arm is slidably received within a narrow portion of the slot, and the coupler is slidably received within a wide portion of the slot.

24 Claims, 12 Drawing Sheets

(56) References Cited

U.S. PATENT DOCUMENTS

| | | | | |
|---|---|---|---|---|
| D882,734 | S * | 4/2020 | Seum | D23/238 |
| D882,736 | S * | 4/2020 | Eads | D23/252 |
| 10,689,835 | B2 | 6/2020 | Davidson et al. | |
| D930,120 | S | 9/2021 | Park | |
| 11,149,418 | B2 * | 10/2021 | Manga | F16K 11/0787 |
| 2008/0054210 | A1 | 3/2008 | Smith | |
| 2011/0011389 | A1 | 1/2011 | Ryu | |
| 2011/0197984 | A1 | 8/2011 | Thomas | |
| 2012/0222763 | A1 | 9/2012 | Yang | |
| 2012/0248351 | A1 | 10/2012 | Huang | |
| 2013/0036853 | A1 | 2/2013 | Huang | |
| 2013/0160881 | A1 | 6/2013 | Kuo | |
| 2013/0263936 | A1 | 10/2013 | Vries | |
| 2014/0090722 | A1 | 4/2014 | Lange | |
| 2014/0215710 | A1 | 8/2014 | Christ | |
| 2015/0055433 | A1 | 2/2015 | Lange | |
| 2015/0211646 | A1 | 7/2015 | Kemp | |
| 2016/0018011 | A1 | 1/2016 | Lange | |
| 2016/0168829 | A1 | 6/2016 | Chen | |
| 2019/0170263 | A1 | 6/2019 | Sell | |
| 2019/0271140 | A1 * | 9/2019 | Davidson | F16L 29/002 |
| 2020/0270852 | A1 | 8/2020 | Manga | |
| 2022/0127830 | A1 | 4/2022 | Hayes et al. | |

OTHER PUBLICATIONS

Alibaba, Bathroom Fittings High Body Faucet Washing Basin Bronze Antique Copper Mixer, retrieved from https://www.alibaba.com/product-detail/Bathroom-Fittings-High-Body-Faucet-Washing_1825792712.html?spm=a2700.7724857. normalList57.5b84428beJjvfo on Sep. 14, 2018, 6 pages.

Kohler K-596-VS Vibrant Stainless Simplice Single-Hole Kitchen, retrieved from https://www.build.com/kohler-k-596-kitchen-faucet/s563679?uid=1770065&source=gg-gba-pla_1770065!c959262446!a46509172966!dc!ng&gclid=Cj0KCQjww8jcBRDZARIsAJGCSGt8Jg03TOpwG-hgAr1SkdO5Vx6s5ow6le4NfZGM9aegn6VTdI319LcaAk94EALw_wcB, on Sep. 7, 2018, 11 pages.

Grohe 33330001 Starlight Chrome Eurodisc Pull-Out Kitchen Faucet, retrieved from https://www.build.com/grohe-33-330-kitchen-faucet/s173555?uid=1594063&source=gg-gba-pla_1594063!c959262446!a46509172966!dc!ng&gclid=Cj0KCQjww8jcBRDZARIsAJGCSGtOLMD-NX57HgLdIIFWQsbMluGueNMTzIh18v3180SRhvtTAJsca-UaApDnEALw_wcB, on Sep. 7, 2018, 2 pages.

Grohe 32665001 Starlight Chrome Concetto Pull-Down High-Arc Kit, retrieved from https://www.build.com/grohe-32-665-kitchen-faucet/s163597?uid=1594165&source=gg-gba-pla_1594165!c959262446!a46509172966!dc!ng&gclid=Cj0KCQjww8jcBRDZARIsAJGCSGvq6B-aklrhgPtriU2NjuJ2hz8rouXHxrOppFGSVkeD8KM8NGnAHyAaAuyuEALw_wcB, on Sep. 7, 2018, 2 pages.

* cited by examiner

LEVER HANDLE FOR A FAUCET

BACKGROUND AND SUMMARY OF THE DISCLOSURE

The present invention relates to a valve assembly for a faucet and, more particularly, to a faucet valve assembly including a lever handle operably coupled to a handle hub.

Conventional kitchen faucets may include a lever handle assembly having a blade and a base coupled to a rotatable stem of a valve cartridge. A handle hub may cover the base and an upper end of the valve cartridge. A known lever handle assembly is shown, for example, in U.S. Pat. No. 11,149,418 to Manga, the disclosure which is expressly incorporated herein by reference.

In conventional lever handle assemblies, it may be difficult to install a blade into a receiver of the base. The present disclosure is directed to a structure facilitating simple and efficient coupling of a thin blade to a handle hub of a lever handle assembly.

According to an illustrative embodiment of the present disclosure, a faucet handle assembly for use with a valve assembly of a faucet includes a support base, and a handle hub supported for rotation relative to the support base. The handle hub includes an end wall having a slot with a narrow portion and a wide portion. A lever handle is operably coupled to the handle hub. The lever handle includes an arm and a coupler. The arm is slidably received within the narrow portion of the slot, and the coupler is slidably received within the wide portion of the slot. A retainer is supported by the coupler and configured to secure the lever handle to a rotatable valve stem.

According to another illustrative embodiment of the present disclosure, a valve assembly of a faucet includes a valve body having a longitudinal axis, and a valve cartridge supported by the valve body. The valve cartridge includes a cartridge housing, a moveable valve member received within the cartridge housing, and a longitudinally extending valve stem operably coupled to the moveable valve member. A handle hub is supported for rotation relative to the valve body. The handle hub includes an end wall having a slot with a narrow portion and a wide portion. A lever handle is operably coupled to the handle hub. The lever handle includes an arm and a coupler. The arm is slidably received within the narrow portion of the slot, and the coupler is slidably received within the wide portion of the slot.

According to another illustrative embodiment of the present disclosure, a faucet assembly includes a delivery spout having a valve body, the valve body defining a longitudinal axis and including a hot water inlet, a cold water inlet, and a mixed water outlet. A valve cartridge supported by the valve body. The valve cartridge includes a cartridge housing, a moveable valve member received within the cartridge housing, and a longitudinally extending valve stem operably coupled to the moveable valve member. A handle hub is supported for rotation relative to the valve body. The handle hub includes an end wall having a slot with a narrow portion and a wide portion. A lever handle is operably coupled to the handle hub. The lever handle includes an arm and a coupler. The arm is slidably received within the narrow portion of the slot, and the coupler is slidably received within the wide portion of the slot.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures in which.

DETAILED DESCRIPTION OF THE DRAWINGS

Figure 1:
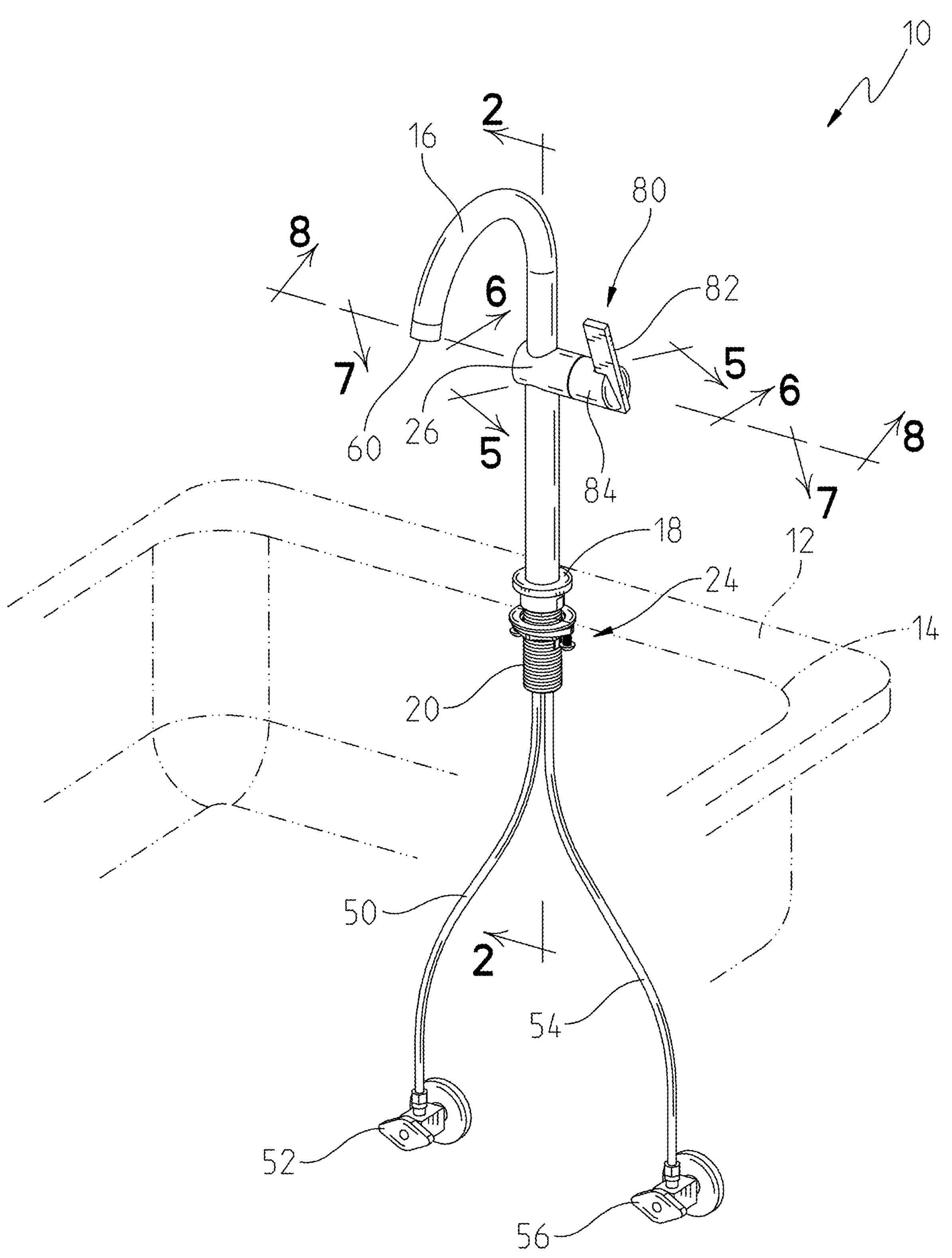
FIG. 1 is a perspective view of a faucet including an illustrative lever handle assembly of the present disclosure, the faucet shown installed on a sink deck.

The embodiments of the invention described herein are not intended to be exhaustive or to limit the invention to the precise forms disclosed. Rather, the embodiments selected for description have been chosen to enable one skilled in the art to practice the invention.

With reference initially to FIGS. 1-4, an illustrative faucet assembly 10 is shown coupled to sink deck 12 supporting a sink basin 14. The illustrative faucet assembly 10 includes a spout 16 extending upwardly from a hub or escutcheon 18. An externally threaded mounting shank 20 extends downwardly from the hub 18 through an opening 22 in the sink deck 12. A conventional mounting assembly 24 threadably engages with the mounting shank 20, and cooperates with the hub 18 to secure (via clamping) the faucet assembly 10 to the sink deck 12.

A valve body 26 is illustratively supported by the spout 16. The valve body 26 illustratively includes a support base or interface 28 and a cylindrical sidewall 30 defining a chamber 32 to receive a valve assembly 34. The valve assembly 34 may be a conventional manual mixing valve cartridge 36 including an outer housing 38 receiving a movable valve member 40. A valve stem 42 is operably coupled to the valve member 40. According to an illustrative embodiment of the present disclosure, the valve cartridge 36 may be similar to that detailed in U.S. Pat. No. 11,149,418 to Manga, the disclosure which is expressly incorporated herein by reference.

Figure 2:
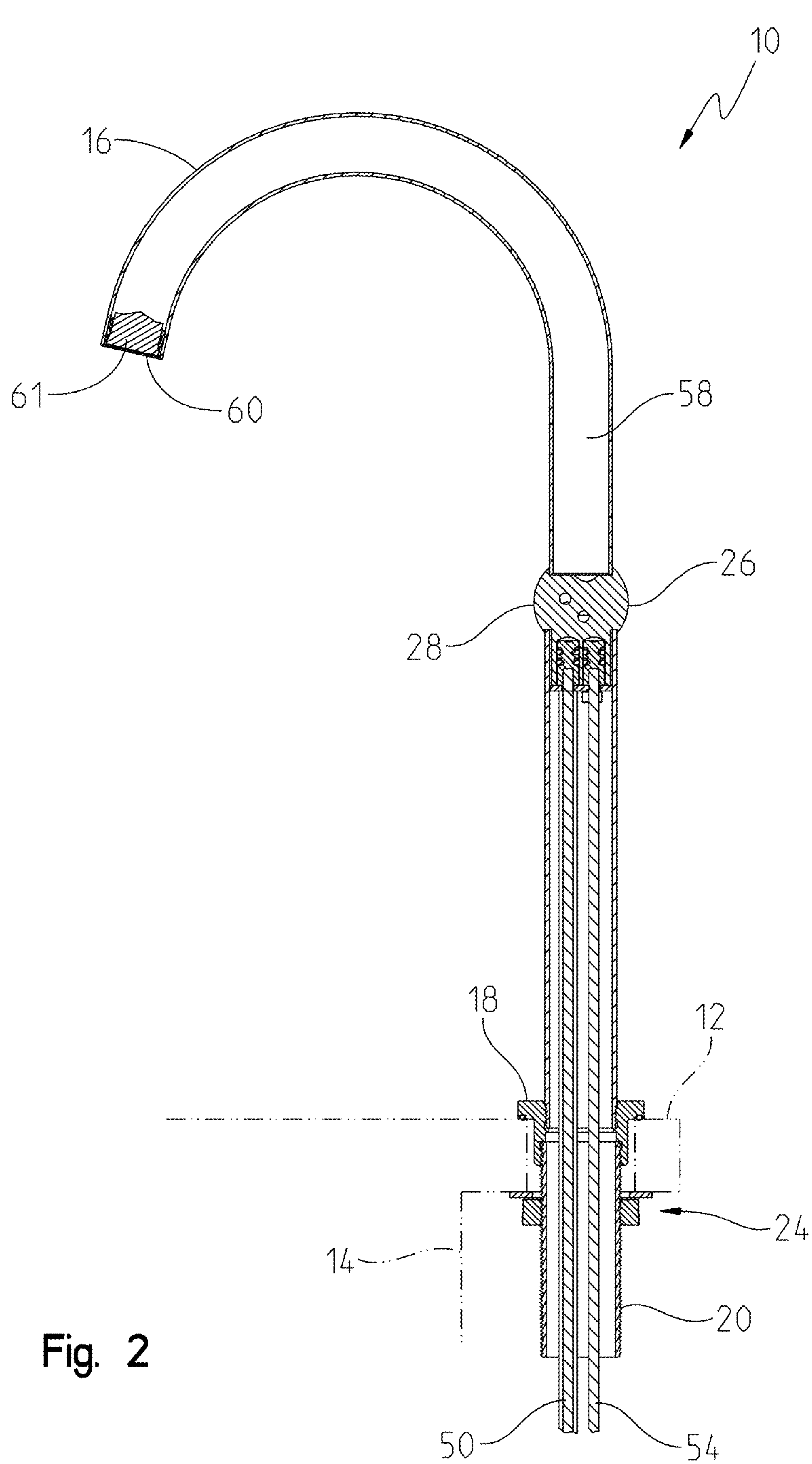
FIG. 2 is a cross-sectional view taken along line 2-2 of FIG. 1.
Figure 3:
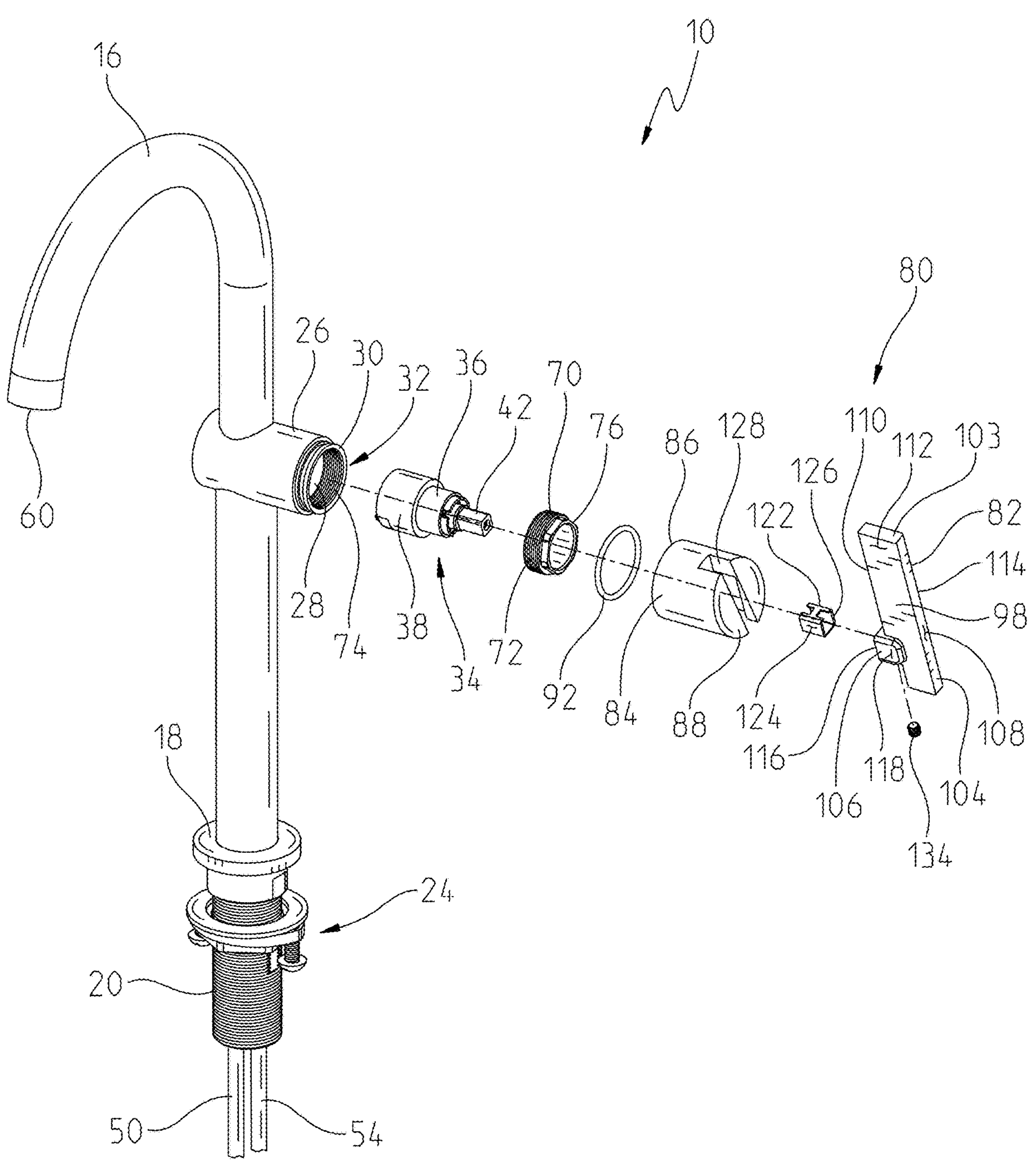
FIG. 3 is a right side partially exploded perspective view of the faucet of FIG. 1.
Figure 4:
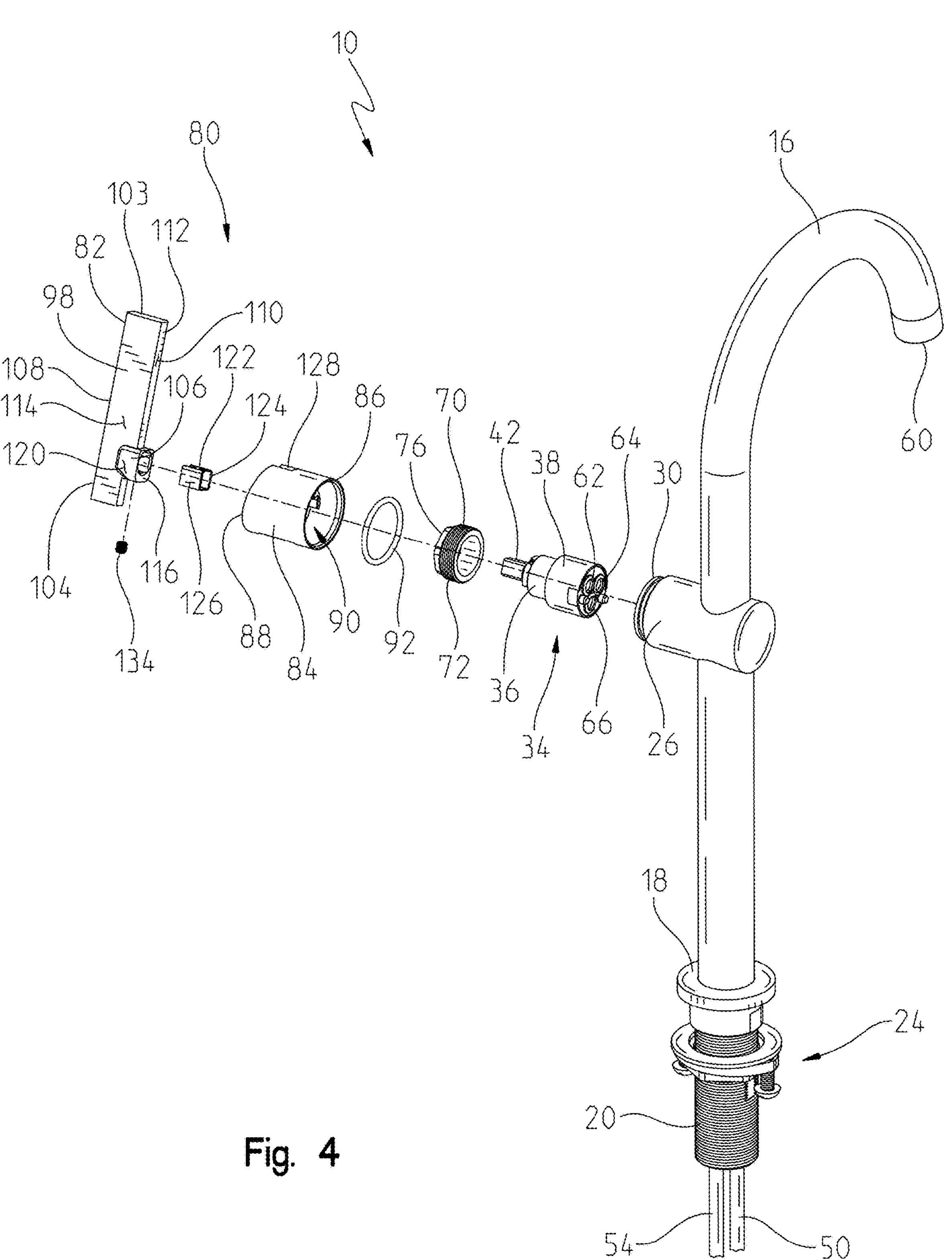
FIG. 4 is a left side partially exploded perspective view of the faucet of FIG. 1.
Figure 5:
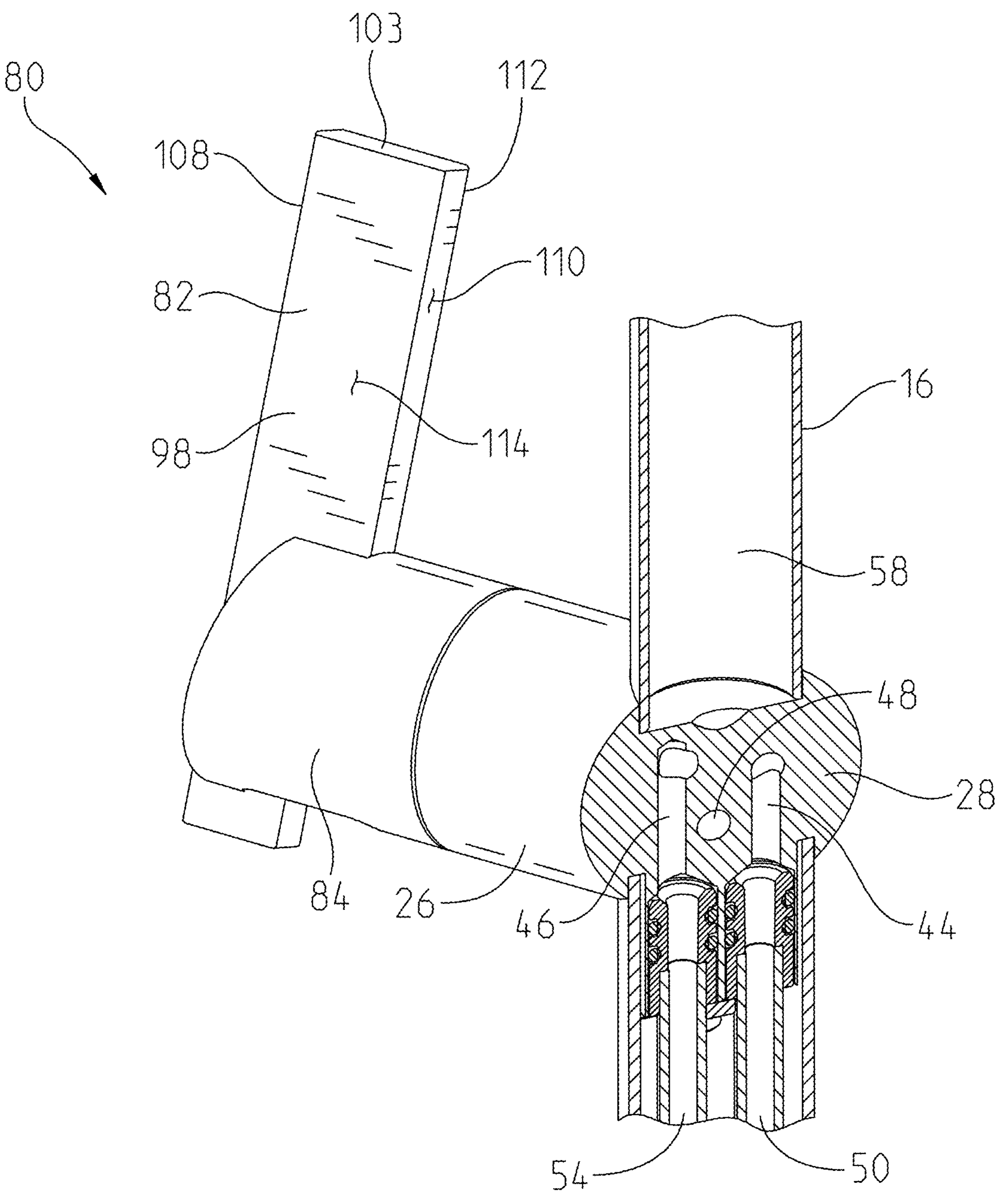
FIG. 5 is a cross-sectional view taken along line 5-5 of FIG. 1.

With reference to FIGS. 2 and 5, the illustrative support base 28 includes a hot water passageway 44, a cold water passageway 46 and a mixed water passageway 48. A hot water supply tube 50 fluidly couples the hot water passageway 44 to a hot water supply, illustratively a conventional hot water stop valve 52. A cold water supply tube 54 fluidly couples the cold water passageway 46 to a cold water supply, illustratively a conventional cold water stop valve 56. The delivery spout 16 includes a spout passageway 58 defining an outlet 60 for dispensing water from the valve cartridge 36 into the sink basin 14. More particularly, the spout passageway 58 is fluidly coupled to the mixed water passageway 48. An aerator 61 may define the outlet 60. In certain illustrative embodiments, a sprayhead (not shown) may be removably coupled to the delivery spout 16 and defines the outlet 60.

The outer housing 38 of the valve cartridge 36 illustratively includes a hot water inlet 62, a cold water inlet 64 and a mixed water outlet 66. The hot water inlet 62 interfaces with the hot water passageway 44 of the support base 28, the cold water inlet 64 interfaces with the cold water passageway 46 of the support base 28, and the mixed water outlet 66 interfaces with the mixed water passageway 48.

A bonnet nut 70 illustratively secures the valve cartridge 36 within the valve body 26. More particularly, the bonnet nut 70 includes external threads 72 that engage with internal threads 74 of the sidewall 30 of the valve body 26. The bonnet nut 70 also includes a tool engagement portion 76 to facilitate threading of the bonnet nut 70 to the valve body 26.

A handle assembly 80 is illustratively operably coupled to the valve assembly 34. The illustrative handle assembly 80 includes a handle 82 coupled to a handle hub 84. The handle hub 84 includes a sidewall 86 and an end wall 88 defining a cavity 90. A retention or coupling ring 92, illustratively a resilient o-ring, is positioned between an inner surface 94 of the hub 84 and an outer surface 96 of the valve body 26.

The handle 82 may comprise a conventional user input, illustratively a lever handle 98. The valve body 26 illustratively receives the valve cartridge 36, which couples independently to the handle hub 84 and the handle 82, so that when a user moves the handle 82, components of the valve cartridge 36 also move to control water flow through the respective faucet assembly 10.

In an illustrative embodiment, the handle 82 of the valve assembly 34 may be rotated about an axis substantially parallel to a longitudinal axis 100 of the valve body 26 or about the longitudinal axis 100 of the valve body 26. In a further illustrative embodiment, the handle 82 of the valve assembly 34 may be lifted in a direction substantially away from the coupling ring 92 of the valve assembly 34 for pivoting movement about a transverse axis 102 orthogonal or perpendicular to the longitudinal axis 100, as illustrated in FIGS. 10C and 10D. In yet another illustrative embodiment, the handle 82 of the valve assembly 34 may be capable of both rotating about an axis substantially parallel to the longitudinal axis 100 of the valve body 26 and being lifted in a direction substantially away from the coupling ring 92 of the valve assembly 34 for pivoting movement about axis 102. For example, in a faucet assembly having a single cartridge valve-style handle, the handle 82 of the valve assembly may be lifted to pivot about axis 102 to control the water flow velocity or rate of the faucet, wherein various angles of the lever correspond with various rates of water flow.

In either a faucet assembly having a single cartridge valve-style handle or a faucet assembly having dual cartridge valve-style handles, the handle 82 of the valve assembly 34 may be rotated about axis 100 to control the temperature of the water flow for the respective faucet assembly. Further, in either a faucet assembly having a single cartridge valve-style handle or a faucet assembly having dual cartridge valve-style handles, the handle 82 of the valve assembly 34 may be rotated to control the water flow rate for the respective faucet assembly.

The illustrative lever handle 98 includes an arm 103 and a base or coupler 106 affixed to the stem 42 of the valve cartridge 36. The arm 103 illustratively includes a flat handle blade 104 having a distal (upper) surface 108, a proximal (lower) surface 110, first side surface 112 and a second side surface 114. The distal surface 108 and the proximal surface 110 are illustratively planar surfaces extending parallel to each other. Similarly, the first side surface 112 and the second side surface 114 are illustratively planar surfaces extending parallel to each other. As such, the handle blade 104 has a substantially rectangular cross-section.

The coupler 106 extends outwardly from the proximal surface 110 of the blade 104 and includes a proximal surface 116, a first side surface 118 and a second side surface 120. The coupler 106 may receive an adapter 122 including opposing side surfaces 124 and 126 extending parallel to the first and second side surfaces 116 and 120 of the coupler 106. The adapter 122 is illustratively received intermediate the valve stem 42 and the coupler 106.

Figures 6, 7:
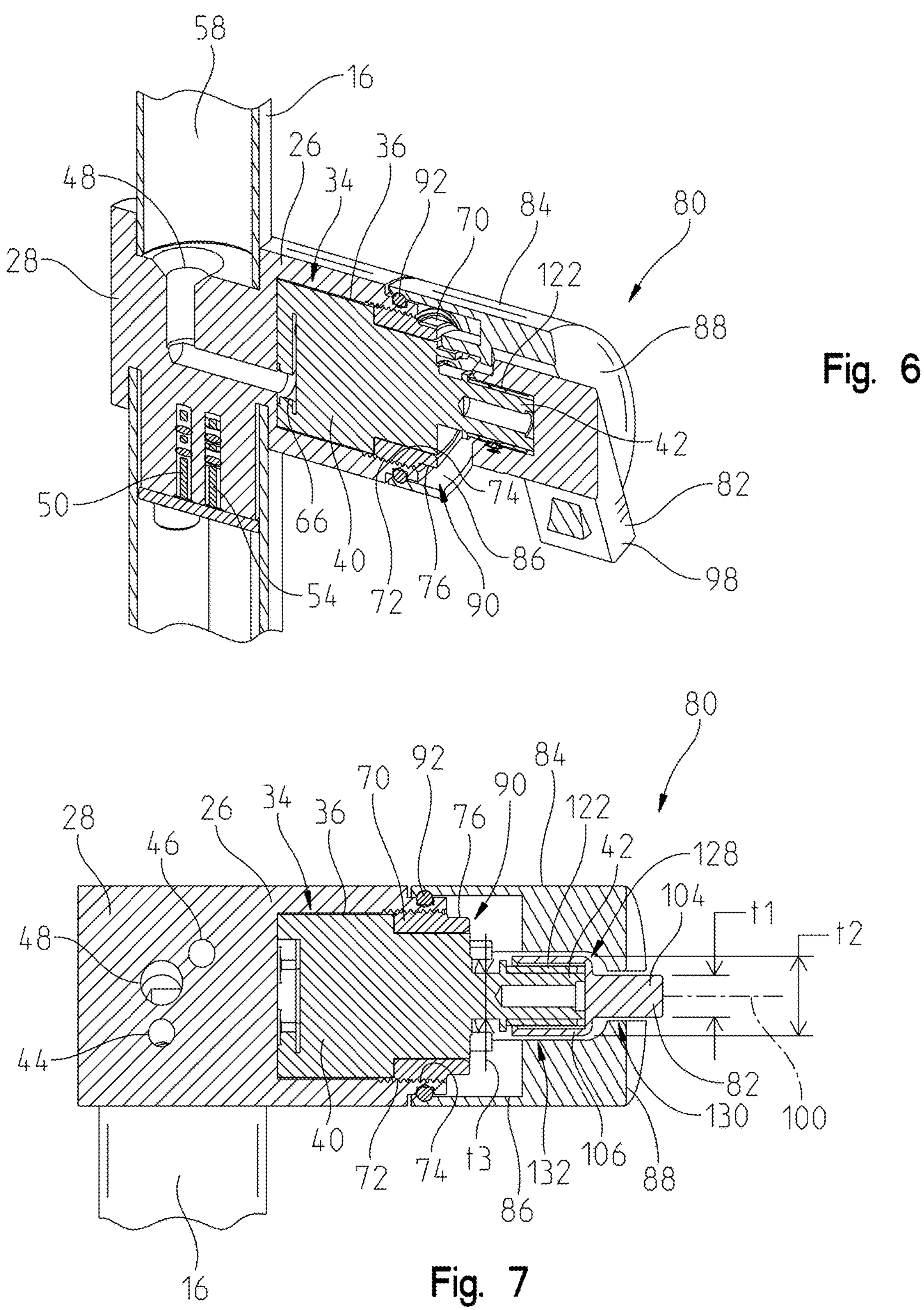
FIG. 6 is a cross-sectional view taken along line 6-6 of FIG. 1.
FIG. 7 is a cross-sectional view taken along line 7-7 of FIG. 1.
Figure 8:
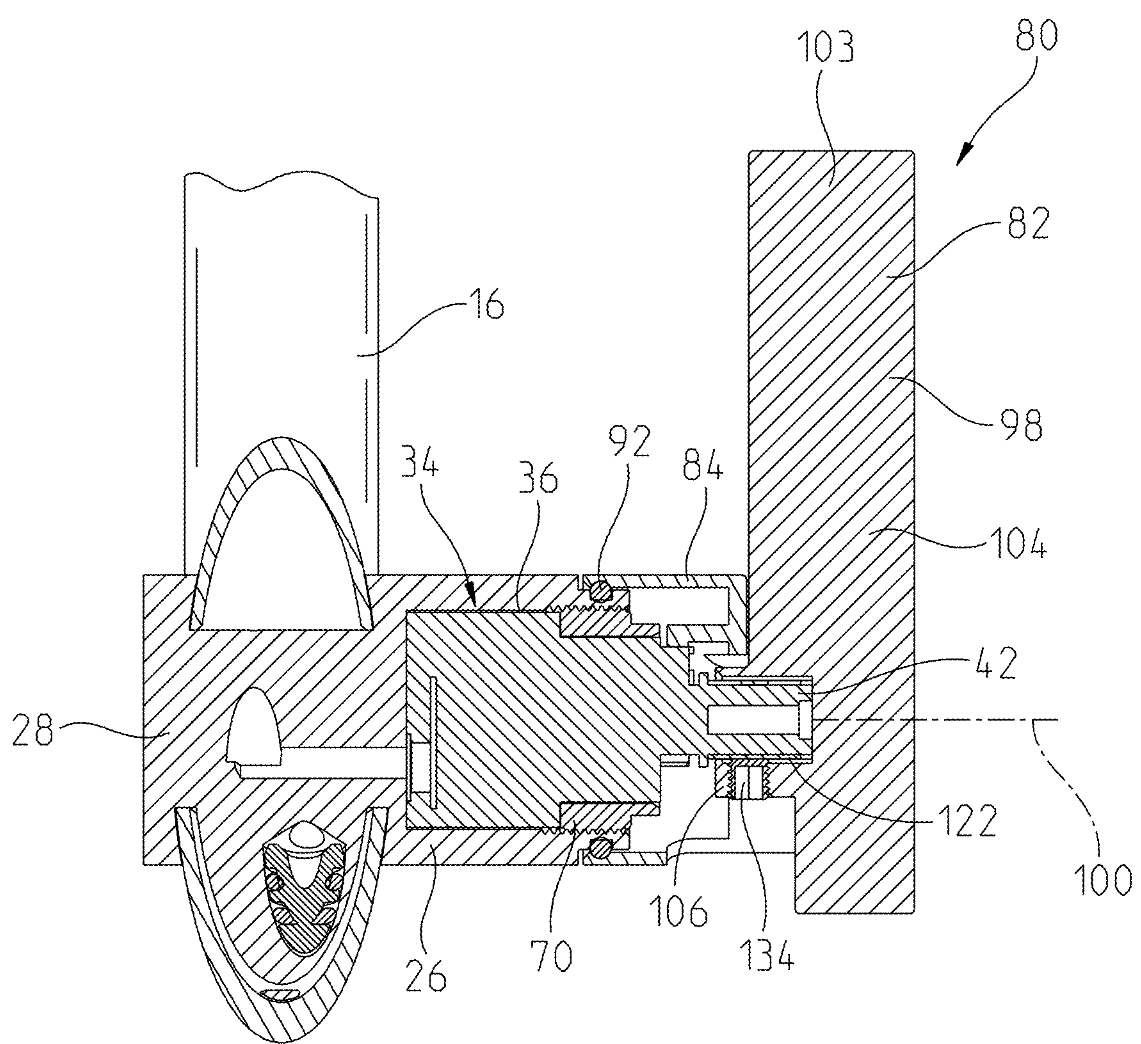
FIG. 8 is a cross-sectional view taken along line 8-8 of FIG. 1.
Figure 9:
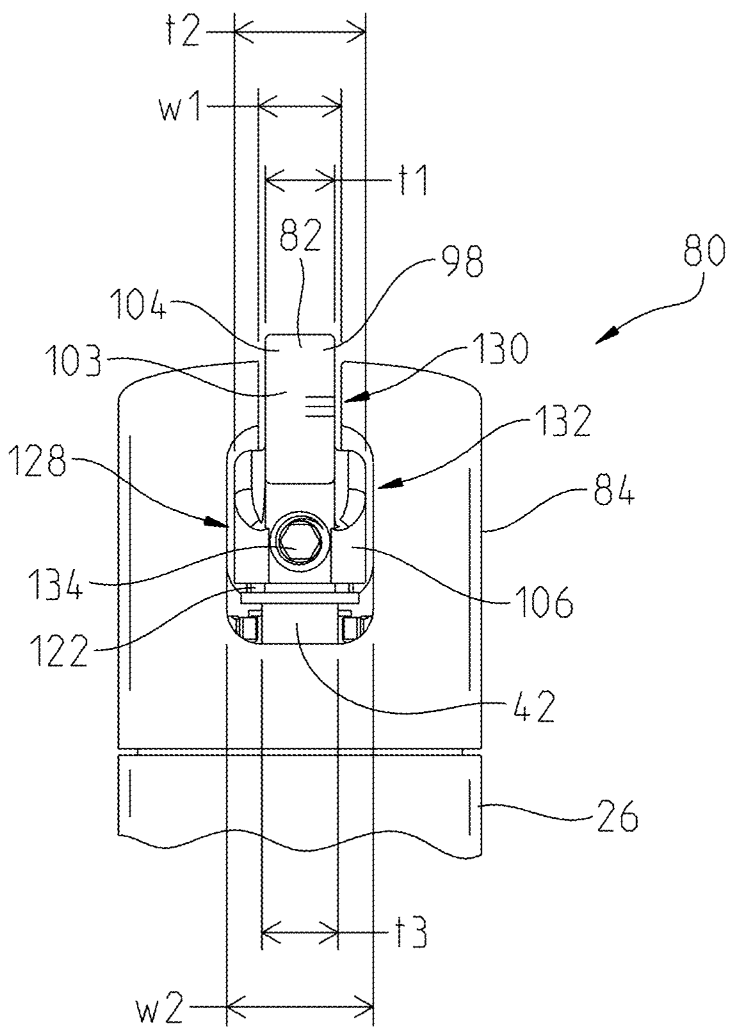
FIG. 9 is a perspective view of the handle assembly of the faucet of FIG. 1, showing the handle blade coupled to the handle hub.

With reference to FIGS. 7 and 9, the handle blade 104 illustratively has a thickness t1 less than a thickness t2 of the coupler 106. In certain illustrative embodiments, the valve stem 42 has a thickness t3 less than thickness t1 of the handle blade 104. Thickness t1 extends between opposing side surfaces 112 and 114 of the handle blade 104, thickness t2 extends between opposing side surfaces 116 and 120 of the coupler 106, and thickness t3 extends between opposing sides of the valve stem 42.

To facilitate assembly of the thin handle blade 104 to the hub 84, the end wall 88 of the hub 84 includes a slot 128. The slot 128 includes an upper (narrow) portion 130 and a lower (wide) portion 132. The upper portion 130 slidably receives the blade 104 of the lever handle 98, while the lower portion 132 slidably receives the coupler 106 of the lever handle 98 which is secured to the valve stem 42. The upper portion 130 of the slot 128 has a width w1 greater than a width w2 of the lower portion 132 of the slot 128. Width w2 of the lower portion 132 of the slot 128 is configured to accommodate the thicker coupler 106. Simultaneously, width w1 of the upper portion 130 of the slot 128 closely receives the thin handle blade 104. A retainer 134, illustratively a set screw, secures the lever handle 98 to the valve stem 42.

The handle hub 84 illustratively covers the coupler 106 of the lever handle 98 and a distal (upper) end of the valve cartridge 36. In other words, the wide portion 132 of the slot 128 is positioned below the narrow portion 130 of the slot 128, thereby reducing visibility of the wide portion 132 of the slot 128 when the lever handle 98 is operably coupled to the handle hub 84.

Figure 10:
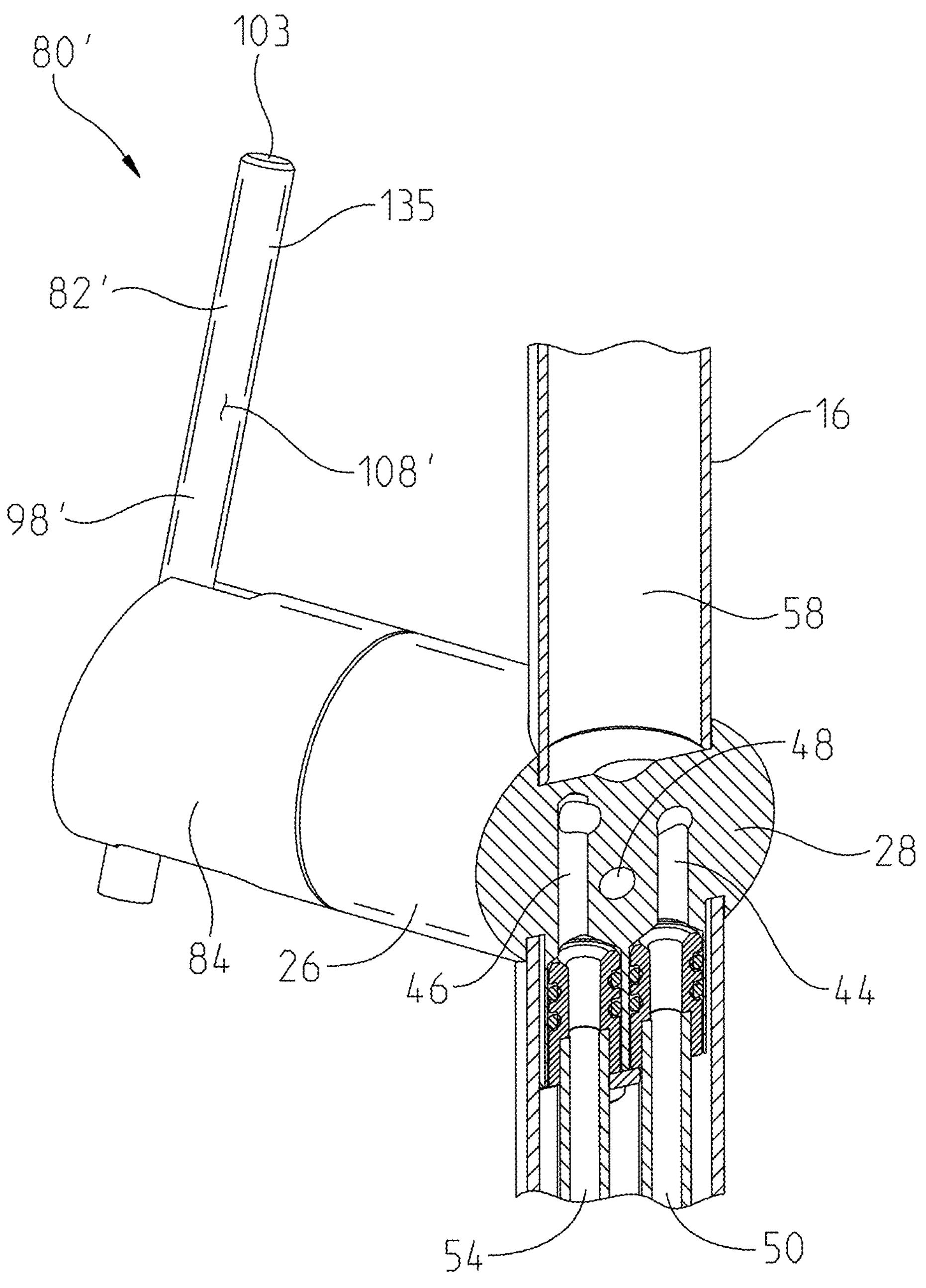
FIG. 10 is a cross-sectional view similar to FIG. 5 showing a further illustrative handle assembly.
Figure 11:
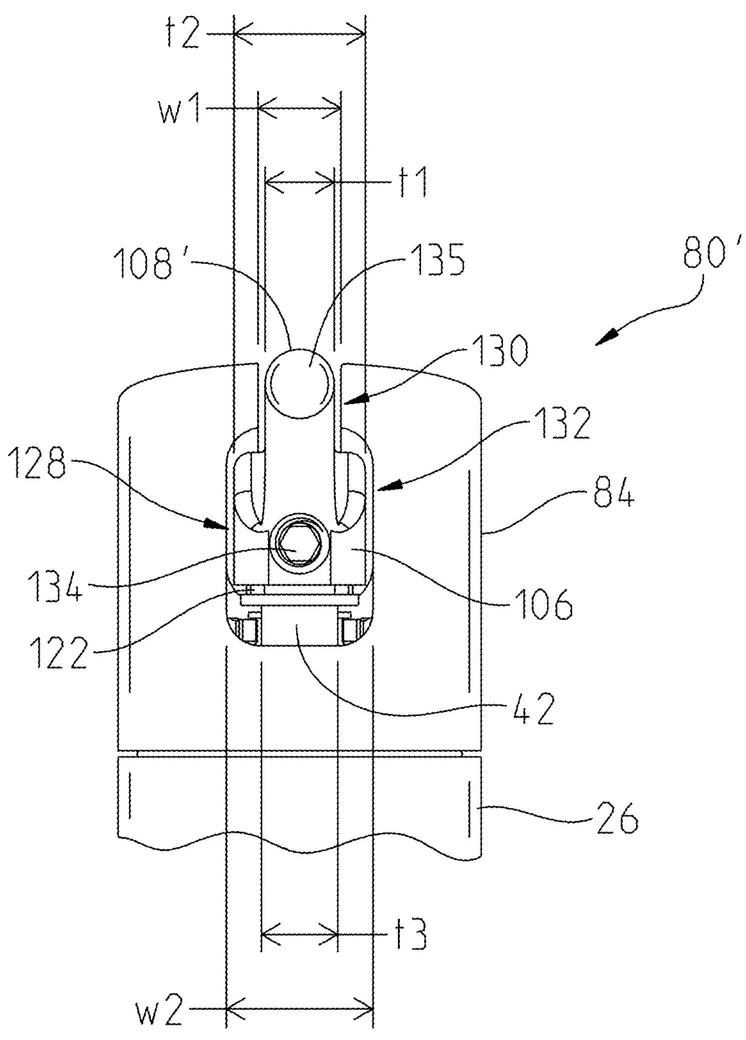
FIG. 11 is a perspective view similar to FIG. 9 showing the handle rod coupled to the handle hub.

FIGS. 10 and 11 show a further illustrative handle assembly 80' including many features similar to those of handle assembly 80 detailed above. As such, in the following description similar features are identified with like reference numbers.

The illustrative lever handle 98 includes an arm 103' and a base or coupler 106 affixed to the stem 42 of the valve cartridge 36. The arm 103' illustratively includes a round handle rod 135 having a cylindrical outer surface 108'. As such, the handle rod 135 has a substantially circular cross-section. The handle rod 135 illustratively has a diameter or thickness t1 similar to that detailed above with respect to the handle blade 104. While flat blades and round rods are shown in the illustrative embodiment lever arms 103, 103', it should be appreciated that other shapes and sizes may be substituted therefor.

Figure 12B:
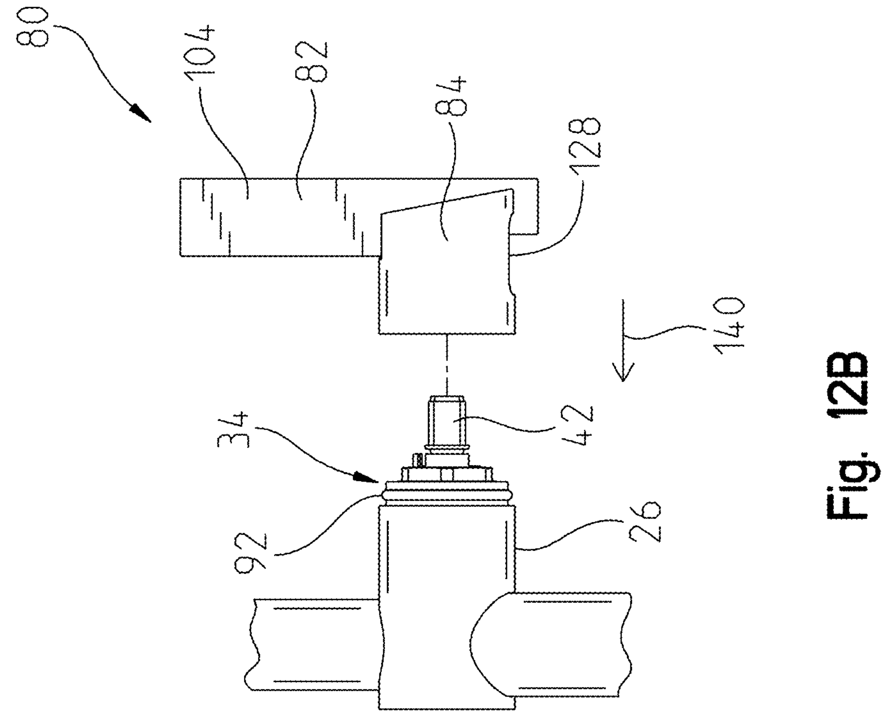
FIG. 12B is a front elevational view of the handle assembly of the faucet of FIG. 1, showing components of the handle assembly in an intermediate stage of installation.
Figure 12A:
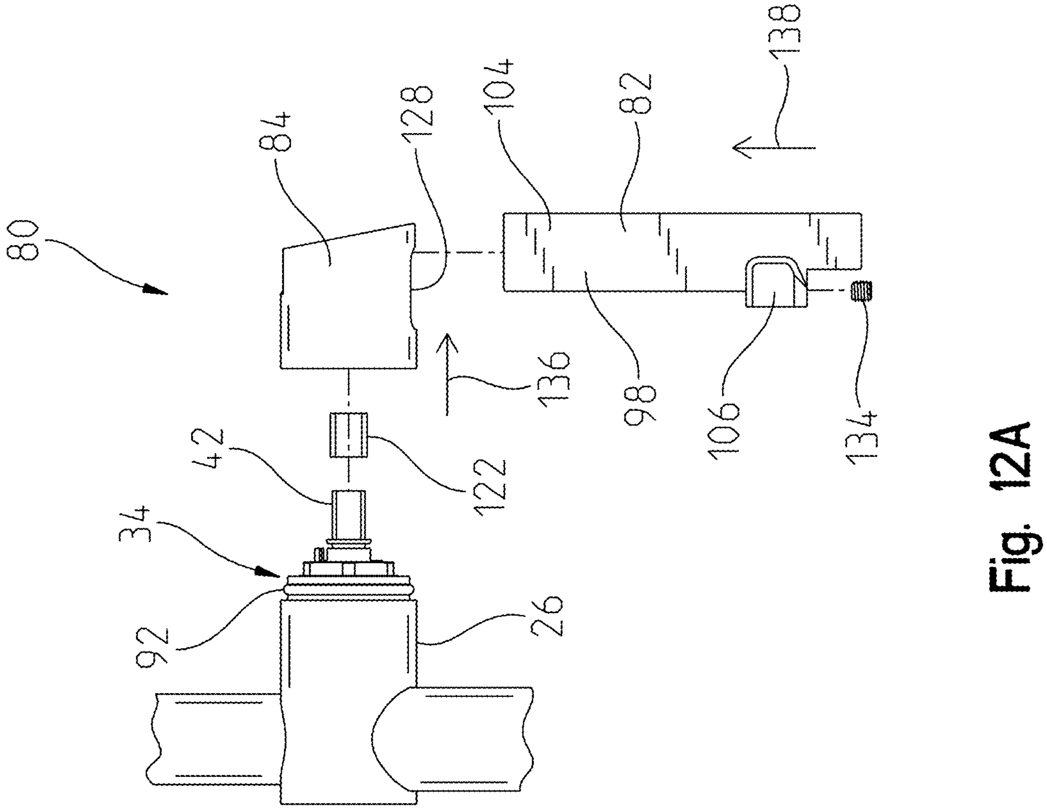
FIG. 12A is a front elevational view of the handle assembly of the faucet of FIG. 1, showing components of the handle assembly in an initial stage of installation.

An illustrative method of assembly of the faucet assembly 10 is shown in FIGS. 12A-12D. FIG. 12A illustrates components of the handle assembly 80 in an initial stage of installation. At this stage, the valve cartridge 36 is received within the valve body 26 and secured therein by the bonnet nut 70. FIG. 12B shows the handle assembly 80 in an intermediate stage of installation where the adapter 122 is received within the handle hub 84 (by moving it in the direction of arrow 136 in FIG. 12A).

Between the initial stage of FIG. 12A and the intermediate stage of FIG. 12B, the handle blade 104 and the coupler 106 are slidably received within the upper portion 130 and the lower portion 132, respectively, of the slot 128 by moving the lever handle 98 in the direction of arrow 138 (FIG. 12A). More particularly, the handle assembly 80 loosely slides through the wider portion 132 of the slot 128 of the handle hub 84 and the narrow portion 130 of the slot 128 of the handle hub 84 into an aligned position for the valve stem 42.

Figure 12D:
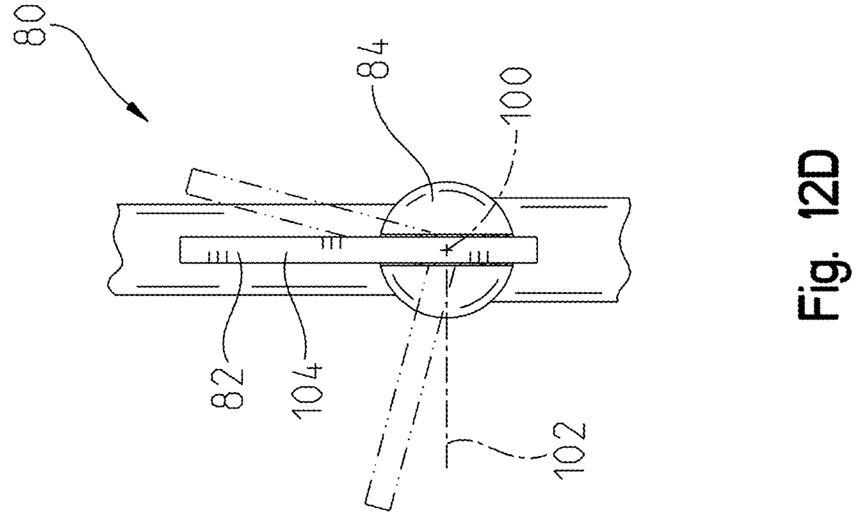
FIG. 12D is a side elevational view of the handle assembly of FIG. 12C.
Figure 12C:
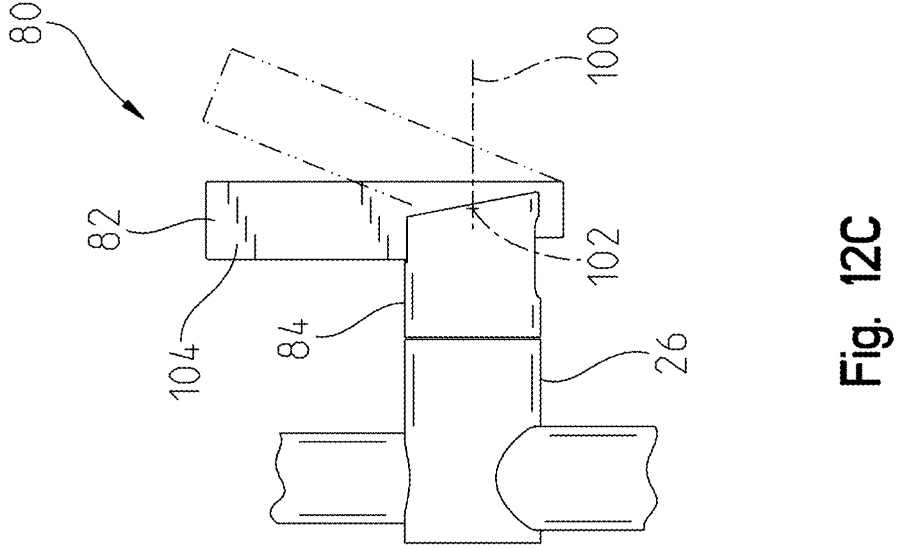
FIG. 12C is a front elevational view of the handle assembly, showing components of the handle assembly fully installed within the faucet of FIG. 1.

FIG. 12C shows the handle assembly 80 fully installed within the valve body 26 of the faucet assembly 10. The handle hub 84 is moved in the direction of arrow 140 (FIG. 12B) such that the retainer 122 receives the valve stem 42, while simultaneously the handle hub 84 is retained on the valve body 26. More particularly, the handle hub 84 is axially retained relative to the valve body 26, and hence the valve cartridge 36, via the retention ring 92. The set screw 134 is then tightened to secure the retainer 122 and the valve stem 42 to the handle hub 84.

As detailed above, FIGS. 12C and 12D further illustrate operation of the handle assembly 80. More particularly, FIG. 12C demonstrates pivoting movement of the handle blade 104 relative to the handle hub 84 about the transverse axis 102, illustratively to control the flow rate of water discharged from the outlet 60. FIG. 12D demonstrates rotating movement of the handle hub 84 about the longitudinal axis 100, illustratively to control the temperature of water discharged from the outlet 60.

Although the invention has been described in detail with reference to certain preferred embodiments, variations and modifications exist within the spirit and scope of the invention as described and defined in the following claims. For example, although the invention has been described in detail with reference to a closed mixing valve cartridge, the invention may also be used in conjunction with an open mixing valve cartridge or any other type of valve for which a connection between a handle hub and a valve cartridge may be desired.

The invention claimed is:

1. A faucet handle assembly for use with a valve assembly of a faucet, the faucet handle assembly comprising:

a support base;

a handle hub supported for rotation relative to the support base, the handle hub including an end wall having a slot with a narrow portion and a wide portion;

a lever handle operably coupled to the handle hub, the lever handle including an arm and a coupler, the arm slidably received within the narrow portion of the slot, and the coupler slidably received within the wide portion of the slot; and a retainer supported by the coupler, the retainer configured to secure the lever handle to a rotatable valve stem.

2. The faucet handle assembly of claim 1, wherein the retainer comprises a set screw.

3. The faucet handle assembly of claim 2, further comprising a stem insert received within the coupler of the lever handle and cooperating with the set screw.

4. The faucet handle assembly of claim 1, further comprising an o-ring positioned radially intermediate the base and the handle hub.

5. The faucet handle assembly of claim 1, wherein the support base is defined by a delivery spout of a faucet.

6. The faucet handle assembly of claim 1, wherein the handle hub is rotatable about a longitudinal axis, and the lever handle is pivotable about a transverse axis perpendicular to the longitudinal axis.

7. The faucet handle assembly of claim 6, wherein the handle hub is configured to rotate the valve stem about the longitudinal axis to control one of a temperature of water and a flow rate of water, and the lever handle is configured to pivot the valve stem about the transverse axis to control the other of a flow rate of water and a temperature of water.

8. The faucet handle assembly of claim 1, wherein the arm of the lever handle includes at least one of a blade or a rod.

9. A valve assembly for a faucet, the valve assembly comprising:

a valve body defining a longitudinal axis;

a valve cartridge supported by the valve body, the valve cartridge including a cartridge housing, a moveable valve member received within the cartridge housing, and a longitudinally extending valve stem operably coupled to the moveable valve member;

a handle hub supported for rotation relative to the valve body, the handle hub including an end wall having a slot with a narrow portion and a wide portion; and a lever handle operably coupled to the handle hub, the lever handle including an arm and a coupler, the arm slidably received within the narrow portion of the slot, and the coupler slidably received within the wide portion of the slot.

10. The valve assembly of claim 9, further comprising a retainer supported by the coupler, the retainer configured to secure the lever handle to a valve stem.

11. The valve assembly of claim 10, wherein the retainer comprises a set screw.

12. The valve assembly of claim 11, further comprising a stem insert received within the coupler of the lever handle and cooperating with the set screw.

13. The valve assembly of claim 9, further comprising an o-ring positioned radially intermediate the valve body and the handle hub.

14. The valve assembly of claim 9, wherein the handle hub is rotatable about a longitudinal axis, and the lever handle is pivotable about a transverse axis perpendicular to the longitudinal axis.

15. The valve assembly of claim 14, wherein the handle hub is configured to rotate the valve stem about the longitudinal axis to control one of a temperature of water and a flow rate of water, and the lever handle is configured to pivot the valve stem about the transverse axis to control the other of a flow rate of water and a temperature of water.

16. The valve assembly of claim 9, wherein the arm of the lever handle includes at least one of a blade or a rod.

17. The valve assembly of claim 9, wherein the wide portion of the slot is positioned below the narrow portion of the slot, thereby reducing visibility of the wide portion of the slot when the lever handle is operably coupled to the handle hub.

18. A faucet assembly comprising:

a delivery spout including a valve body;

the valve body defining a longitudinal axis and including a hot water inlet, a cold water inlet and a mixed water outlet;

a valve cartridge supported by the valve body, the valve cartridge including a cartridge housing, a moveable valve member received within the cartridge housing, and a longitudinally extending valve stem operably coupled to the moveable valve member;

a handle hub supported for rotation relative to the valve body, the handle hub including an end wall having a slot with a narrow portion and a wide portion; and a lever handle operably coupled to the handle hub, the lever handle including a blade and a coupler, the blade slidably received within the narrow portion of the slot, and the coupler slidably received within the wide portion of the slot.

19. The faucet assembly of claim 18, further comprising a retainer supported by the coupler, the retainer configured to secure the lever handle to a valve stem.

20. The faucet assembly of claim 19, further comprising a stem insert received within the coupler of the lever handle and cooperating with the retainer.

21. The faucet assembly of claim 18, further comprising an o-ring positioned radially intermediate the valve body and the handle hub.

22. The faucet assembly of claim 18, wherein the handle hub is rotatable about a longitudinal axis, and the lever handle is pivotable about a transverse axis perpendicular to the longitudinal axis.

23. The faucet assembly of claim 22, wherein the handle hub is configured to rotate the valve stem about the longitudinal axis to control one of a temperature of water and a flow rate of water, and the lever handle is configured to pivot the valve stem about the transverse axis to control the other of a flow rate of water and a temperature of water.

24. The faucet assembly of claim 18, wherein the arm of the lever handle includes at least one of a blade or a rod.

* * * * *